3,408,259
PROCESS FOR DETECTING STAPHYLOCOCCI-ENTEROTOXIN IN FOODSTUFFS

Werner Herbert Krüger, Birkenwerder, near Berlin, Iwan Milanow Stojanow, Berlin-Pankow, and Gerd Friedrich Meeser, Bergfelde, near Berlin, Germany, assignors to Institut fur Mitchforschung Oranienburg, Oranienburg, near Berlin, Germany
No Drawing. Filed Jan. 21, 1966, Ser. No. 522,040
2 Claims. (Cl. 195—103.5)

The present invention relates to a process for detecting staphylococci-enterotoxin in foodstuffs of animal origin, primarily milk and dairy products, for the prevention of food poisoning.

Attempts have been made to obtain a satisfactory differentiation between enterotoxin-forming and other pathogenic staphylococci by means of cultures, seriological and biological methods including lysotyping and antibiograms. It has been established that the enterotoxin, after having been thoroughly purified, is a water-soluble protein having an isoelectric point at pH 8.6 and a molecular weight of 23,000; also, that the enterotoxin is antigenic. Tests were made for the mentioned differentiations with persons who volunteered, and with animals such as monkeys, cats, frogs, rabbits and pigeons. Furthermore, tests were made on chick embryos, white mice, dogs, young pigs, nematodes and on specimens of organs, and with absorption analysis; all these methods are known in the art.

The known methods of testing, however, are unsatisfactory because they are not specific enough of the enterotoxin, or they have proved to be inoperable for routine testing. As to lack of differentiation, the methods proved unsatisfactory to determine enterotoxin-forming as distinguished from other pathogenic staphylococci. When persons volunteered for the testing, who were not very reliable in their dispositions, no conclusive evidence was to be had, particularly when the persons knew of the effect of the filtrates they were taking. An evaluation of such tests is therefore hard to make and does not give better results than some of the detecting methods carried out with animals. Finally, such testing on humans is not entirely without danger.

Another very serious drawback of all known methods is the long time involved, which is up to 21 days; this, of course, makes the methods unacceptable for the prevention of food poisoning.

It is an object of the present invention to provide a method for detecting staphylococci-enterotoxins which can be carried out in a much shorter period while giving reliable figures.

It is another object to provide such a method with the elimination of animal testing.

It is yet another object to detect the presence of staphylococci-enterotoxin in so short a period that food poisoning by intake of products of animal origin, primarily milk and dairy products, will be safely prevented.

In providing such a method serious risks to the health of the population are eliminated which is an important goal in the public health.

The objects are achieved in accordance with the invention by using as a test material ejaculated sperm of male amphibians for instance, Bufo-bufo, Rana-aesculenta, which were treated with hormones of the anterior lobe of the pituitary gland such as gonadotropin and follicle stimulating hormone (F.S.H.) 3–5 milliliter of 10 I.U. (international units); the sperm is withdrawn after one hour. After having determined the percentage of the mobile spermozoa, a determined amount of sperm is mixed with an equal amount of the extract to be tested, prepared by known methods, which has previously been purified and allowed to stand for 30 to 60 minutes at a temperature of about 56° C. to 85° C. It is then observed by means of a microscope to what extent the mobility of the spermatozoa has decreased within a given period. The decrease is given in percentage, and the presence of staphylococci-enterotoxin is then calculated per unit of weight.

The technical and economical improvement of this measure consists therein that a rapid and inexpensive method has been found to determine the presence of staphylococci-enterotoxin thus preventing substantial economical damage and risk to health. Poisoning of foodstuffs can be determined so rapidly that these foods may be taken off the market and important improvement in public health can thereby be accomplished.

The simplicity of the process and the low requirements of test material and equipment permit the application in all sectors of food supervision.

In the following the invention will be more particularly described in a specific example but is should be understood that it is given by way of illustration and not of limitation and that many changes in details can be made without departing from the spirit of the invention.

EXAMPLE

According to the invention ejaculated sperm of male amphibians such as Bufo-bufo or Rana-aesculenta is obtained by treatment of the amphibians with 3 to 5 milliliters of 10 I.U. of hormones of the anterior lobe of the pituitary gland such as gonadotropin and follicle stimulating hormones. The ejaculation of the sperm is caused by injection of the hormone into the dorsal sac, thereupon the sperm collects in the cloaca. From there, the sperm is withdrawn after one hour and the number of mobile spermotozoa is at once observed and noted. Normally, the mobility is between 90 and 95 percent. After having noted the mobility, 0.02 ml. of sperm is immediately mixed with 0.02 ml. of an extract of the food to be tested. The extract is separately prepared by methods known in the art. One of the known methods consists in extracting the foodstuffs to be tested with water or with sodium chloride solution with subsequent centrifugation. There are other methods known for preparing the extract, but they do not form a part of the present invention.

The extract is allowed to stand for thirty minutes at a temperature of about 56° C. to about 85° C. before being mixed with the sperm.

Depending on the presence of staphylococci-enterotoxin, a decrease in the mobility of the spermatozoa amounting to 10 to 90 percent of the original mobility can be observed within ten seconds to twenty minutes.

The observed loss in mobility compared to the original mobility of the spermatozoa gives an accurate measure as to the presence of staphylococci-enterotoxin per microgram of foodstuff.

The foregoing disclosure relates only to preferred embodiments of the invention which is intended to include all changes and modifications of the example described within the scope of the invention as set forth in the appended claims.

What is claimed is:

1. A process for detecting staphylococci-enterotoxin in foodstuffs which comprises preparing ejaculated sperm of male amphibians by treating the amphibians with 3 to 5 milliliters of 10 international units of pituitary gland gonadotropin or follicle stimulating hormone, allowing the sperm to remain in the cloaca of the amphibian for an hour, then withdrawing the sperm and determining the percentage of mobile spermatozoa by microscopic observation, mixing a determined amount of the sperm with an equal amount of the purified extract of the foodstuffs to be examined after having heated the foodstuffs for 30 to 60 minutes to a temperature in the range of 56° C.

to 85° C., determining the decrease in mobility in the spermatozoa within 10 seconds to 20 minutes and calculating by comparison with the original mobility of the spermatozoa the presence of staphylococci-enterotoxin per weight unit of foodstuffs.

2. The process for detecting staphylococci-enterotoxin in foodstuffs according to claim 1 wherein said equal amounts are each 0.02 ml. and the period and temperature of said heat are 30 minutes and about 56° C. respectively.

References Cited
UNITED STATES PATENTS
3,360,441   12/1967   Burmeister _____ 195—103.5

ALVIN E. TANENHOLTZ, *Primary Examiner.*